United States Patent Office 3,591,516
Patented July 6, 1971

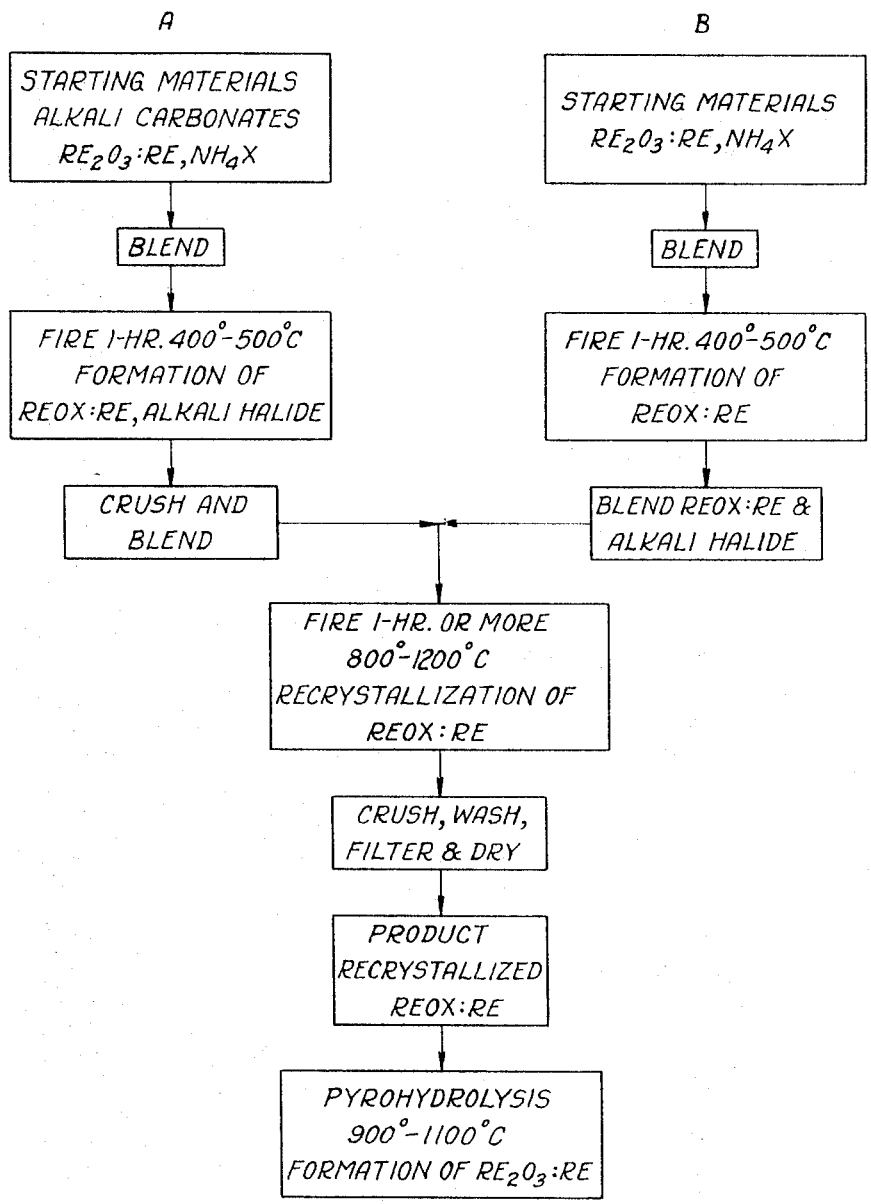

3,591,516
FUSED SALT PROCESS FOR PRODUCING RARE EARTH OXYHALIDE AND OXIDE LUMINESCENT MATERIALS
Jacob G. Rabatin, Chardon, Ohio, assignor to General Electric Company
Filed Oct. 23, 1968, Ser. No. 769,940
Int. Cl. C09k 1/08, 1/10
U.S. Cl. 252—301.4R           11 Claims

ABSTRACT OF THE DISCLOSURE

A method for the production of well-formed crystals of oxyhalides including oxychlorides and oxybromides, and oxides, of yttrium and the rare earth metals, i.e., elements having atomic numbers 39 and 57 through 71. Particles of the oxide of the selected element are mixed with the ammonium halide of the selected oxyhalide and heated for a time and at a temperature sufficient to cause conversion of the oxide to the oxyhalide and recrystallization of the oxyhalide. This recrystallized oxyhalide can be converted to a corresponding oxide as well-crystallized particles by pyrohydrolysis. Alternatively, the oxyhalide can be formed by initially firing the oxide particles as a mixture with an alkali carbonate and ammonium halide in order to form the alkali halide in situ prior to the firing step which causes formation and recrystallization of the oxyhalide.

By starting with rare earth-activated oxides, the process of the invention produces luminescent materials which are useful for cathode ray tube applications, in lamps, and in X-ray applications such as in image converter tubes and film intensifier screens.

CROSS REFERENCES TO RELATED APPLICATIONS

Phosphors for luminescent materials which can be made according to the process of the present invention are described and claimed in copending applications filed concurrently herewith and identified as Lanthanum and Gadolinium Oxyhalide Luminescent Materials Activated with Terbium and X-ray Image Converters Utilizing the Same, Ser. No. 769,894, filed in the names of Jacob G. Rabatin and Robert A. Sieger, and Lanthanum and Gadolinium Oxybromide Luminescent Materials Activated with Erbium, Ser. No. 769,860, and Lanthanium and Gadolinium Oxyhalide Luminescent Materials Activated with Dysprosium, Ser. No. 769,922, both filed in the name of Jacob G. Rabatin.

An alternative process for the production of these materials is described and claimed in the copending application filed concurrently herewith and identified as Gaseous Reaction Process for the Production of Rare Earth Oxyhalide and Oxide Luminescent Materials, Ser. No. 780,928, filed in the name of Jacob G. Rabatin. All of the four above-identified applications are assigned to the assignee of the present application.

BACKGROUND OF THE INVENTION

The present invention relates to processes for producing well-formed crystals of rare earth and yttrium oxyhalides and oxides. More particularly, the invention also relates to processes for producing such materials which include activators that permit the materials to luminesce under appropriate excitation.

Methods used for preparation of these materials in the prior art have included the evaporation to dryness of the rare earth trihalides followed by heating or hydrolysis to obtain the corresponding oxyhalides. These methods have resulted in low efficiencies, apparently at least due in part to great difficulty in controlling the final purity of the oxyhalide material itself. Also, oxides produced by pyrohydrolysis of the corresponding oxyhalides will carry over certain of the good or bad luminescent characteristics of the oxyhalides.

For certain applications, it is desirable to have relatively large, well-formed crystalline particles of these oxyhalide and oxide materials. This is particularly so when the materials are doped with activators such as certain of the rare earth metals and used as X-ray sensitive phosphors. There are not available in the art processes which are entirely suitable for the production of relatively large, well-formed crystalline particles of these materials, particularly for X-ray phosphor applications. Crystalline particles with sizes approaching 50 microns are particularly useful in X-ray image converter tubes and fluoroscopic screens.

SUMMARY OF THE INVENTION

Briefly stated, the present invention in certain of its embodiments provides a process for the production of well-formed crystals of at least one oxyhalide, selected from the group consisting of oxychlorides and oxybromides, of at least one of the elements having atomic numbers 39, and 57 through 71, comprising the following steps: heating mixtures of particles of the oxide of the selected element and the ammonium halide of the selected oxyhalide for a time and at a temperature sufficient to form the oxyhalide of the selected element, heating a mixture of said oxyhalide with an alkali halide selected from the group consisting of the chlorides and bromides of at least one alkali metal for a time of at least about one hour at a temperature above the melting temperature of the selected alkali halide material to recrystallize said oxyhalide.

Other embodiments include blending alkali carbonates with the starting materials so that the alkali halide is formed in situ on the first firing at temperatures such as 400 to 500° C. for a time such as one hour. Also, optionally, the recrystallized oxyhalide may be converted to the corresponding oxide by pyrohydrolysis, giving well-formed particles, some of which are single crystals and others of which are polycrystalline. Recrystallized oxyhalide and oxide particles can be made in accordance with the invention with relatively large particle sizes, such as 3 to at least 30 microns average diameter. The pyrohydrolysis is preferably performed in the temperature range of about 900 to 1100° C.

The elements of which the oxides and oxyhalides are produced in accordance with the invention include element 39 which is yttrium, and elements 57 through 71 which are as follows: 57—lanthanum, 58—cerium, 59—praseodymium, 60—neodymium, 61—promethium, 62—samarium, 63—europium, 64—gadolinium, 65—terbium, 66—dysprosium, 67—holmium, 68—erbium, 69—thulium, 70—ytterbium, and 71—lutetium.

The oxides and oxyhalides formed in accordance with the invention can also be produced in an activated state to permit luminescence upon appropriate excitation under X-ray, cathode ray, or ultraviolet radiation. The activators which may be used include cerium, praseodymium, neodymium, samarium, europium, terbium, dysprosium, holmium, erbium, and thulium.

Phosphors prepared according to the invention include preferably for some purposes the identified oxides and oxyhalides of lanthanum, gadolinium and yttrium. Particularly useful materials prepared in accordance with the invention include terbium-activated lanthanum oxybromide and terbium-activated lanthanum oxychloride.

When gadolinium oxide activated with europium is prepared in accordance with the invention by using as an intermediate gadolinium oxychloride prepared according to the invention, the formation of the gadolinium oxychloride is preferably performed for about one to four hours in the temperature range of 400 to 500° C., and the recrystallization is preferably performed for about one to four hours in the temperature range of 800 to 1200° C. under a slightly oxidizing atmosphere.

It is an object of the present invention to provide a process for the production of improved crystalline particles of oxyhalides and oxides of the rare earth metals and yttrium.

BRIEF DESCRIPTION OF THE DRAWING

The sole figure of the drawing is a flow diagram showing the steps of the two alternative routes of the invention with preferred temperatures and times and using rare earth activation. The final conversion of the recrystallized oxyhalide to oxide which is shown in the drawing is optional and is used only if the product desired is the oxide rather than the oxyhalide.

DESCRIPTION OF THE PREFERRED EMBODIMENTS

Processes of the invention are particularly desirable for the production of large, well-formed crystals of the identified oxyhalides and oxides. In contrast to methods generally reported in the literature, materials produced in accordance with the invention can be readily formed essentially free of deleterious impurities and unwanted compounds, such as the rare earth trihalides and unwanted rare earth oxides mixed with the desired oxyhalide materials, while also being in the form of well-crystallized large particles.

The process of the invention will be described below in terms of production of yttrium oxychloride and yttrium oxide, each activated with europium, known as YOCl:Eu and $Y_2O_3$:Eu. Analogous processes are used to make the oxyhalides of the other selected elements of the invention and the other oxyhalides, with activators being added as approprite, preferably in the oxalate precipitation step. The starting materials for the processes of the invention can be made as described in the two following paragraphs, or they can be made by other methods known in the art.

Preferably, the oxides of yttrium and europium are slurried in water, then dissolved by addition of $HNO_3$ followed by boiling for several minutes. The solution is then cooled to about 50 to 60° C., then, solid oxalic acid is added in amounts such as 120 to 200% of the stoichiometric amount, and the reaction mixture is stirred for about five minutes, during which time the oxalates of yttrium and europium are coprecipitated. The mixture is then allowed to cool and the coprecipitated oxalates are removed by filtration without washing. The oxalate is dried at 100% C. in air and then fired to the oxide in air for one hour at about 1100° C. Fused silica boats and firing tubes are used. This gives the mixed yttrium oxide and europium activator in a form suitable for use in production of the yttrium oxyhalide or oxide luminescent material.

More specifically, 10.80 grams of 99.9% $Y_2O_3$ are dissolved with 0.79 grams of 99.9% $Eu_2O_3$, coprecipitated, dried and fired to the oxides as described above.

In one preferred process route, the mixed yttrium oxide and europium is blended with an alkali carbonate such as $Na_2CO_3$ and also with $NH_4Cl$. The mixture is then fired for one hour in the temperature range of 400 to 500° C. to form YOCl activated with europium intimately mixed with NaCl. This mixture is crushed and blended and then fired for at least one hour at a temperature in the range of 800 to 1200° C. to recrystallize the yttrium oxychloride luminescent material. The material is crushed, washed, filtered and dried and is suitable for use as a well-crystallized luminescent material of the invention.

Alternatively, alkali halides such as NaCl could have been added after formation of yttrium oxychloride activated with europium and before the recrystallization firing, instead of using the alkali carbonate in the first step. Other alkali salts which can be readily used include the carbonates and halides of potassium and lithium. Reference can be made to the drawing for an illustration of these two alternative processing routes.

The above-described process may be described as follows for producing GdOCl:Eu and $Gd_2O_3$:Eu. 10 grams of $Gd_2O_3$: 0.035 $Eu_2O_3$ are mixed with 2.5 grams of $Li_2CO_3$ and 7.4 grams of $NH_4Cl$. The mixture is fired for one hour at 450° C. in a covered crucible. After pulverizing, the material is fired again, this time for one hour at 900° C. On cooling, the material is pulverized and washed free of soluble halides, dried and introduced into a tube furnace such as 1½ inches inside diameter and fired for two hours at 1000° C. in a flowing atmosphere of 300 cubic centimeters per minute of $CO_2$ passed through hot water. When this procedure was conducted, the resulting product was $Gd_2O_3$:0.035 $Eu_2O_3$ of 4 to 6 micron average particle diameter size compared to the original particle size of 0.8 to 1.0 microns. After sifting through 400 mesh screen the material was utilized for various measurements and was found to be a bright phosphor.

As another specific example, a preferred procedure of the invention for producing mixed LaOBr-Cl:Tb phosphors will be described. 10.8 grams of $La_2O_3$-0.15 $Tb_2O_3$ were intimately blended with 2.5 grams of $Li_2CO_3$, 7.3 grams of $NH_4Br$ and 4.0 grams of $NH_4Br$ and 4.0 grams of $NH_4Cl$. The blended material is fired one hour at 450° C. in a covered crucible. These proportions theoretically would give a mix of $LaOBr_{0.5}$:0.15Tb plus 30 weight percent $LiBr_{0.5}$, $Cl_{0.5}$. After firing, the material was crushed and fired again for one hour, this time at 950° C. in a covered crucible. On cooling, the material was pulverized, washed free of soluble halides, dried and sifted through 250 mesh screen. Chemical analysis and X-ray defraction analysis showed a mixed oxyhalide of the following composition: $LaOBr_{0.28}Cl_{0.72}$:0.15Tb indicating that the halogens disproportionate in this manner in the fused product. For higher bromine content in the mixed oxyhalide, higher initial ratios of $NH_4Br$ are used.

Table I below shows average particle diameter (Coulter Counter) for GdOCl:0.035 Eu phosphors made according to the invention with the indicated times and temperatures using varying indicated amounts (relative to GdOCl:Eu) of the alkali halide salts formed in situ from the alkali carbonates.

TABLE I.—PARTICLE SIZES

| Sample No.: | Alkali halide | Wt., percent | Firing Time (hr.) | Firing Temp. (° C.) | Particle size (u) |
|---|---|---|---|---|---|
| 1 | LiCl | 25 | 1 | 900 | 10.0 |
| 2 | LiCl | 50 | 1 | 900 | 9.0 |
| 3 | LiCl | 100 | 1 | 900 | 7.9 |
| 4 | NaCl | 25 | 1 | 1,000 | 11.0 |
| 5 | NaCl | 50 | 1 | 1,000 | 7.6 |
| 6 | NaCl | 100 | 1 | 1,000 | 7.0 |
| 7 | KCl | 25 | 1 | 1,000 | 9.8 |
| 8 | KCl | 50 | 2 | 1,000 | 7.0 |
| 9 | KCl | 50 | 1 | 1,000 | 4.6 |
| 10 | KCl | 100 | 1 | 1,000 | 4.8 |

What I claim as new and desire to secure by Letters Patent of the United States is:

1. A process for the production of well-formed crystals of at least one oxyhalide, selected from the group consisting of oxychlorides and oxybromides, of at least one of the elements having atomic numbers 39, and 57 through 71, comprising the following steps:

heating mixtures of particles of the oxide of the selected element and the ammonium halide whose halide is that of the selected oxyhalide for a time and at a temperature sufficient to form the oxyhalide of the selected element, and heating a mixture of said oxyhalide with an alkali halide of at least one alkali metal whose halide is that of the selected oxyhalide for a time of at least about one hour at a temperature above the melting temperature of the selected alkali halide material to recrystallize said oxyhalide.

2. A process according to claim 1 in which the initial firing step to form the oxyhalide is performed for at least one hour in the temperature range of 400 to 500° C. and the recrystallization of the oxyhalide is performed for at least one hour about in the temperature range of 800 to 1200° C.

3. A process according to claim 1 in which the alkali carbonate of the selected alkali is added to the starting materials before the initial heating step so that it will react with said ammonium halide to form the selected alkali halide in the initial step.

4. A process according to claim 1 in which, subsequent to the steps of claim 1:
said recrystallized oxyhalide particles are subjected to pyrohydrolysis to convert said oxyhalides to oxide crystalline particles.

5. A process according to claim 4 in which said pyrohydrolysis is performed in the temperature range of about 900 to 1100° C.

6. A process according to claim 1 for the production of crystalline particles of luminescent materials wherein the oxyhalide also contains activator proportions of at least one element selected from the group consisting of Ce, Pr, Nd, Sm, Eu, Tb, Dy, Ho, Er, and Tm.

7. A process according to claim 3 for the production of crystalline particles of luminescent materials wherein the oxyhalide also contains activator proportions of at least one element selected from the group consisting of Ce, Pr, Nd, Sm, Eu, Tb, Dy, Ho, Er, and Tm.

8. A process according to claim 4 for the production of crystalline particles of luminescent materials wherein the oxyhalide also contains activator proportions of at least one element selected from the group consisting of Ce, Pr, Nd, Sm, Eu, Tb, Dy, Ho, Er, and Tm, activator proportions being carried over into said oxide crystals and causing said oxide crystals to be luminescent materials.

9. A process according to claim 1 in which said element is selected from the group consisting of lanthanum, gadolinium, and yttrium.

10. A process according to claim 5 in which said luminescent material is terbium-activated lanthanum oxybromide.

11. A process according to claim 5 in which said luminescent material is terbium-activated lanthanum oxychloride.

References Cited

UNITED STATES PATENTS

| | | | |
|---|---|---|---|
| 2,729,605 | 1/1956 | Swindells | 252—301.4 |
| 3,226,334 | 12/1965 | Machida et al. | 252—301.4 |
| 3,368,980 | 2/1968 | Avella et al. | 252—301.4 |
| 3,380,926 | 4/1968 | Harper | 252—301.4 |
| 3,450,643 | 6/1969 | Hoffman | 252—301.4 |
| 3,450,642 | 6/1969 | Hoffman | 252—301.4 |
| 3,457,184 | 7/1969 | Kobayashi et al. | 252—301.4 |
| 3,458,451 | 7/1969 | Kobayashi et al. | 252—301.4 |
| 3,485,768 | 12/1969 | Ropp | 252—301.4 |

ROBERT D. EDMONDS, Primary Examiner

U.S. Cl. X.R.

23—21, 87, 305